US012297971B2

(12) United States Patent
Danner et al.

(10) Patent No.: US 12,297,971 B2
(45) Date of Patent: May 13, 2025

(54) ILLUMINATION DEVICE FOR A MOTOR VEHICLE HEADLIGHT AND MOTOR VEHICLE HEADLIGHT

(71) Applicant: ZKW Group GmbH, Wieselburg (AT)

(72) Inventors: Markus Danner, Ollersdorf (AT); Erwin Lumetsberger, Nöchling (AT); Jörg Bachler, Leiben (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/794,696

(22) Filed: Aug. 5, 2024

(65) Prior Publication Data

US 2025/0052393 A1 Feb. 13, 2025

(51) Int. Cl.

| | |
|---|---|
| ***F21S 41/20*** | (2018.01) |
| ***F21S 41/143*** | (2018.01) |
| ***F21S 41/151*** | (2018.01) |
| ***F21S 41/27*** | (2018.01) |
| ***F21W 102/135*** | (2018.01) |

(52) U.S. Cl.
CPC ........... *F21S 41/285* (2018.01); *F21S 41/143* (2018.01); *F21S 41/151* (2018.01); *F21S 41/27* (2018.01); *F21W 2102/135* (2018.01)

(58) Field of Classification Search
CPC ........ F21S 41/285; F21S 41/27; F21S 41/143; F21S 41/151
See application file for complete search history.

(56) References Cited

U.S. PATENT DOCUMENTS

| | | | |
|---|---|---|---|
| 9,689,545 B2 * | 6/2017 | Wintzer | C03B 11/082 |
| 10,527,248 B2 * | 1/2020 | Taudt | F21S 41/663 |
| 2015/0211701 A1 | 7/2015 | Wintzer et al. | |
| 2018/0128443 A1 * | 5/2018 | Taudt | F21S 41/24 |

(Continued)

OTHER PUBLICATIONS

Extended European Search Report for European Patent Application No. 23190534.0 dated Jan. 26, 2024 (5 Pages).

*Primary Examiner* — Matthew J. Peerce
(74) *Attorney, Agent, or Firm* — Eversheds Sutherland (US) LLP

(57) ABSTRACT

An illumination device (100) for a motor vehicle headlight, with an optical body (1) and a plurality of light guiding bodies (2), wherein the light guiding bodies merge into the optical body with their light exit surfaces (**2*b*) in an optical body merging surface (11) opposite an optical body light exit surface (10) of the optical body. The light guiding bodies are arranged such that light exit surfaces of adjacent light guiding bodies have a distance from one another greater than zero resulting respectively in an open space (12) between two adjacent light guiding bodies on the optical body merging surface. The illumination unit (101) further includes an additional optical device (200) that has at least one light entry area (201) and one or more light extraction areas (202). Each light entry area is associated with at least one additional light source (250**), and at least some of the light injected by an additional light source into the additional optical device via a light entry area propagates in the additional optical device to the one or more light extraction areas and leaves the additional optical device there, wherein respectively at least one, preferably exactly one, light extraction area is arranged between two adjacent light guiding bodies in such a way that light exiting the light extraction area can enter the optical body via the open space between the two light guiding bodies and can propagate therein to the optical body light exit surface of the optical body.

20 Claims, 7 Drawing Sheets

(56) References Cited

U.S. PATENT DOCUMENTS

| | | | | |
|---|---|---|---|---|
| 2020/0032973 | A1* | 1/2020 | Renaud | F21S 41/255 |
| 2021/0231283 | A1 | 7/2021 | Taudt et al. | |
| 2022/0243893 | A1* | 8/2022 | Qiu | F21V 5/04 |

* cited by examiner

ILLUMINATION DEVICE FOR A MOTOR VEHICLE HEADLIGHT AND MOTOR VEHICLE HEADLIGHT

CROSS-REFERENCE TO RELATED APPLICATIONS

This application claims priority to European Patent Application No. 23190534.0, filed Aug. 9, 2023, which is incorporated herein by reference.

FIELD OF THE INVENTION

The invention relates to an illumination device for a motor vehicle headlight, wherein the illumination device comprises an illumination unit, wherein the illumination unit comprises:

- an optical body with an optical body light exit surface, wherein the optical body is formed from an optically transparent material,
- a plurality of light guiding bodies, wherein each light guiding body has a light entry surface and a light exit surface,
- at least one light source for each light guiding body, wherein the at least one light source of a light guiding body can only inject light into this light guiding body, and wherein the light from the at least one light source of a light guiding body is injected into the light guiding body via the light entry surface thereof, wherein the light guiding bodies are formed from an optically transparent material such that light that enters a light guiding body can propagate from the light entry surface to the light exit surface and wherein at least some of the light injected into the light guiding body and striking lateral boundary surfaces of the light guiding body is totally reflected at the boundary surfaces, wherein the light guiding bodies are arranged side-by-side, and wherein the light guiding bodies merge into the optical body with their light exit surfaces in an optical body merging surface opposite the optical body light exit surface of the optical body, wherein the light guiding bodies are arranged in such a way that light exit surfaces of adjacent light guiding bodies have a distance from one another greater than zero resulting respectively in an open space between two adjacent light guiding bodies on the optical body merging surface, and wherein the illumination device further comprises a projection device, which displays the light emitted by the light sources in the form of segmented light distribution.

The expression "a plurality of light guiding bodies" comprises two or more, preferably more than two light guiding bodies.

Furthermore, the invention relates to a motor vehicle headlight having at least one such illumination device.

BACKGROUND

Illumination devices are known from the prior art, for example, in which by modifying a light-permeable body, with which a dipped beam distribution or a front area light distribution can be produced, a sign light distribution can be produced with the same light sources in addition to this light distribution. Other embodiments are also known, in which, for example, a projection device, which is connected upstream of the light-permeable body, is correspondingly modified (for example by means of corresponding optics such as prisms on the projection device) in order to simultaneously produce a sign light light distribution in addition to the originally produced dipped beam or front area light distribution.

For a dipped beam distribution (e.g. Class C, Class V, Class E), there must always be a certain portion of light above the cut-off line. This portion of light above the cut-off line is referred to as sign light, with which, for example, overhead signs can be made easier to see. For example, legally relevant measuring points can be the points S50LL, S50, S50RR (on the V4° line), as well as S100LL, S100, S100RR (on the V2° line).

The big drawback of the known solutions is that these sign lights are produced using the same light sources as those used to produce the dipped beam or front area light distribution; the sign light is therefore always switched on whenever the front area/dipped beam module is illuminated.

Sign light prisms on projection devices also frequently have a negative impact on the visual appearance (both the cold and warm design are affected), and sometimes this projection device is dazzling to oncoming traffic as the sign light comes from a comparatively small area on the projection device.

This "permanent" sign light has also proven disadvantageous in terms of ratings. In glare-free full beams used in modern cars, the area of the oncoming traffic or of a road user ahead is switched off by masking the full beam (=darkening the desired area). However, the sign light from the front area/dipped beam module continues to be illuminated in this area.

In the new US ADB rating in particular, this "glare" leads to a lower rating.

SUMMARY OF THE INVENTION

It is an object of the invention to provide an illumination device that can solve these problems. This object is achieved with an illumination device described in the introduction by virtue of the fact that, according to the invention, the illumination unit further comprises an additional optical device, wherein the additional optical device has at least one light entry area as well as one or more light extraction areas, wherein each light entry area is associated with at least one additional light source, and wherein at least some of the light injected by an additional light source into the additional optical device via a light entry area propagates in the additional optical device to the one or more light extraction areas and leaves the additional optical device there, and wherein respectively at least one, preferably exactly one, light extraction area is arranged between two adjacent light guiding bodies in such a way that light exiting the light extraction area can enter the optical body via the open space between the two light guiding bodies and can propagate therein to the optical body light exit surface of the optical body.

The embodiment described results in open spaces or areas between adjacent light guiding bodies on the surface of the optical body where the light guiding bodies merge into it, which the present invention makes use of.

The illumination unit is typically an illumination unit for generating light distribution, in particular segmented light distribution, which lies substantially above the horizontal 0°-0° line and additionally forms a full beam with a dipped beam or front area light distribution which is produced by another unit/module. In particular, such segmented light distribution can be used for ADB (Adaptive Driving Beam), in which areas above the cut-off line, in particular oncoming traffic areas, can be blanked out.

The use of (a) separate light source(s) to produce the sign light means that it does not have to be permanently operated, either in dipped beam/front area mode or in ADB mode.

The interaction with the optical body, which provides light for the segmented light distribution that is located above the 0°-0° line, also makes it easy to ensure that the sign light light distribution illuminates the desired areas in the light image in a vertical direction.

The light entry area preferably comprises optical elements or an optical structure which directs the inject light in parallel. For example, the light entry area is Fresnel lens-like or designed in the form of a collimator. The light directed in parallel can subsequently propagate in the additional optical device by means of total reflection.

Other advantageous embodiments of the invention are described in the dependent claims.

It is preferably provided that the light extraction areas are arranged below a or the upper edges of the light exit surfaces such that light is injected into the open spaces below the upper edge(s).

The light extraction areas are preferably located at a (small) distance greater than zero from the optical body or can rest against the optical body.

The light coming from the light extraction areas of the light guides is usually projected into an area above a horizontal 0°-0° line in the light image and thus produces the segmented light distribution. In a vertically inverting projection device, the light exit surfaces of the light guiding bodies are positioned such that their upper edge is approximately level with or just above the optical axis of the projection device. As a result of the inverting effect of the projection device, light from the light exit surfaces is (largely) projected above the 0°-0° line, wherein light from the area of the upper edge is projected in the lower area of the light distribution, close to the 0°-0° line, in particular just below it. (If the upper edge lies exactly on the optical axis of the projection device, light coming from the area of the upper edge is projected onto the 0°-0° line.)

Accordingly, light from the light extraction areas below the upper edge is projected at a distance above the horizontal 0°-0° line in the light distribution, resulting in a distance between a dipped beam distribution (which will be explained further below) and a light distribution formed with the light from the light extraction areas, in particular a sign light light distribution.

It can be provided that a main light emission direction of the light exiting a light extraction area is directed approximately parallel to the light emission direction in which light travels from a light guiding body adjacent to the light extraction area.

In this context, it should be noted that parallel light does not typically exit the light guiding bodies; the light emission direction in this case refers to a resulting direction of all emitted light rays.

It can further be provided that a main light emission direction of the light exiting a light extraction area is directed in such a way that the light is projected by the projection device into an area above a 0°-0° line, in particular in such a way that the light of all light extraction areas forms a sign light light distribution.

By way of example, it is provided that the additional optical device consists of a body which is formed from a light-guiding material, wherein the body which forms the additional optical device preferably has the at least one light entry area as well as at least one supply area adjacent thereto, wherein the at least one supply area transitions into a distribution area, via which the light coming from the at least one additional light source is distributed to the one or more light extraction areas.

The light extraction areas are preferably also part of the body.

Two or more light extraction areas can be provided, wherein the distribution area and the light extraction areas preferably have a comb-like shape.

In addition, it can be provided that the supply area runs approximately parallel to the light guiding bodies and the distribution area runs transverse to the light guiding bodies and/or transverse to the supply area, in particular substantially normal to the supply area, and wherein a diversion section is provided for each light extraction area, which is connected to the distribution area, in particular is formed integrally therewith, with which diversion section light is supplied to the light extraction area.

For example, a diversion section has a first deflection area, which deflects the light injected by the distribution area into the diversion section in the main light emission direction.

It can be provided that respectively at least one, in particular exactly one light extraction area is arranged between all adjacent light guiding bodies, or at least one, in particular exactly one, light extraction area is arranged at least between two adjacent light guiding bodies, which are arranged centrally, preferably respectively at least one, in particular respectively exactly one, light extraction area is arranged between several central adjacent light guiding bodies.

The term “central” refers to an arrangement in relation to the optical axis X500 of the projection device, in particular in a horizontal/lateral direction, wherein light guiding bodies which the axis runs through or which are adjacent/close to this axis are referred to as central.

In particular, it can be provided that the light extraction areas are formed and/or arranged in such a way between adjacent light guiding bodies that a sign light light distribution is produced.

By way of example, it can be provided that the optical body and the light guiding bodies are formed in one piece, and preferably from the same optically transparent material.

It can further be provided that the light entry surfaces of the light guiding bodies are arranged at a distance greater than zero to one another, and the light guiding bodies preferably taper from the light exit surface towards the light entry surface.

The light guiding bodies have a conical shape, for example.

In addition, it can be provided that the light rays emitted by the light guiding bodies of the illumination unit are projected by the projection device as segmented light distribution, wherein the light distribution, which comprises two or more adjacent light segments lies in the light image at least partially above a 0°-0° line.

It can further be provided that open spaces, in particular all open spaces are flat and/or an optical structure, for example in the form of grooves, is provided in or on open spaces, in particular in or on all open spaces, in order to achieve uniformity of the generated light distribution, in particular the sign light light distribution, in the horizontal direction.

Furthermore, it is advantageously provided that the illumination device comprises a further illumination unit, the so-called main illumination unit, wherein the main illumination unit is designed to produce a main light distribution, in particular a dipped beam distribution, preferably a dipped beam distribution with a cut-off line, or a front area light distribution, wherein the main light distribution and the segmented light distribution together form a full beam distribution if all light segments of the segmented light distribution are illuminated.

A light exit surface of the illumination device is preferably arranged in such a way that the focal point of the projection device lies substantially in this light exit surface or in an edge delimiting the light exit surface, in particular downwards, such that this edge is displayed sharply in the light image as a cut-off line, which delimits the light distribution upwards.

Finally, it can be provided in this context that in a main lighting mode, the main illumination unit for generating the light distribution and the additional light source for generating the sign light light distribution are activated and the light sources of the illumination unit are deactivated, and wherein in a partial full beam mode, the main illumination unit and at least one light source, but not all light sources of the illumination unit, are activated and the additional light source is dimmed or deactivated.

Thanks to the design according to the invention, the sign light light source can be switched off (or dimmed) in partial full beam mode such that the sign light cannot emit any unwanted scattered light in this operating state.

Partial full beam mode is understood as an operating state in which one or more regions, so-called segments, of full beam distribution are hidden in order, for example, to avoid dazzling oncoming traffic or traffic in front.

In an operating state in which the light distribution, in particular front area light distribution or dipped beam distribution, is produced, the sign light light source can be switched on such that a sign light light distribution is produced in addition to the light distribution, independently thereof. However, in the prior art, the sign light light distribution is produced together with the front area light or dipped beam (i.e. the at least one light source responsible for producing the front area light or dipped beam distribution is also responsible for producing the sign light light distribution) and cannot be switched off independently thereof.

The invention accordingly has advantages in terms of the glare value, in particular when the illumination device is operated in ADB (Adaptive Driving Beam) mode, in which individual regions or segments of (partial) full beam distribution can be switched off. The fact that the sign light is switched off in this operating state, in contrast to the prior art, means that it cannot cause glare in the hidden region or in the hidden/switched off segments. Safety can be enhanced for all road users thanks to the reduction of undesired "residual light", in particular in hidden regions, made possible by the invention. In dipped beam mode, the sign light can be activated to enable the driver, for example, to read overhead signs more easily.

In contrast, in "normal" full beam mode, the sign light light source can be switched on.

BRIEF DESCRIPTION OF THE DRAWINGS

The invention is explained in more detail below based on the drawing.

DETAILED DESCRIPTION

Figure 1:
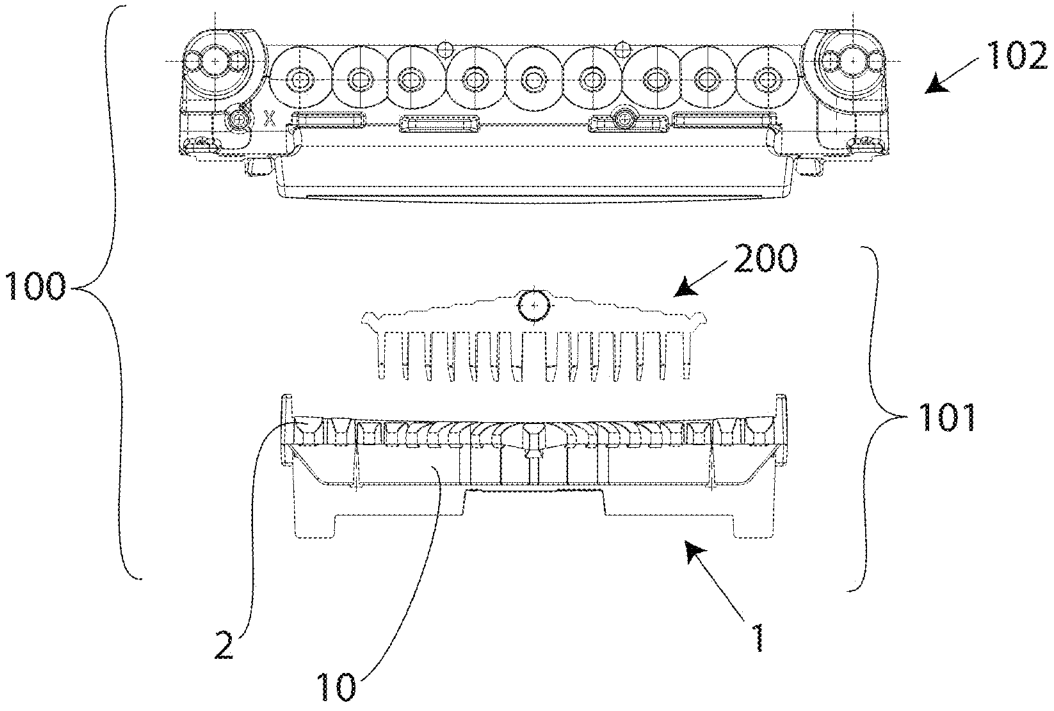
FIG. 1 schematically shows the components of an illumination device for a motor vehicle headlight in a view from behind.
Figure 2:
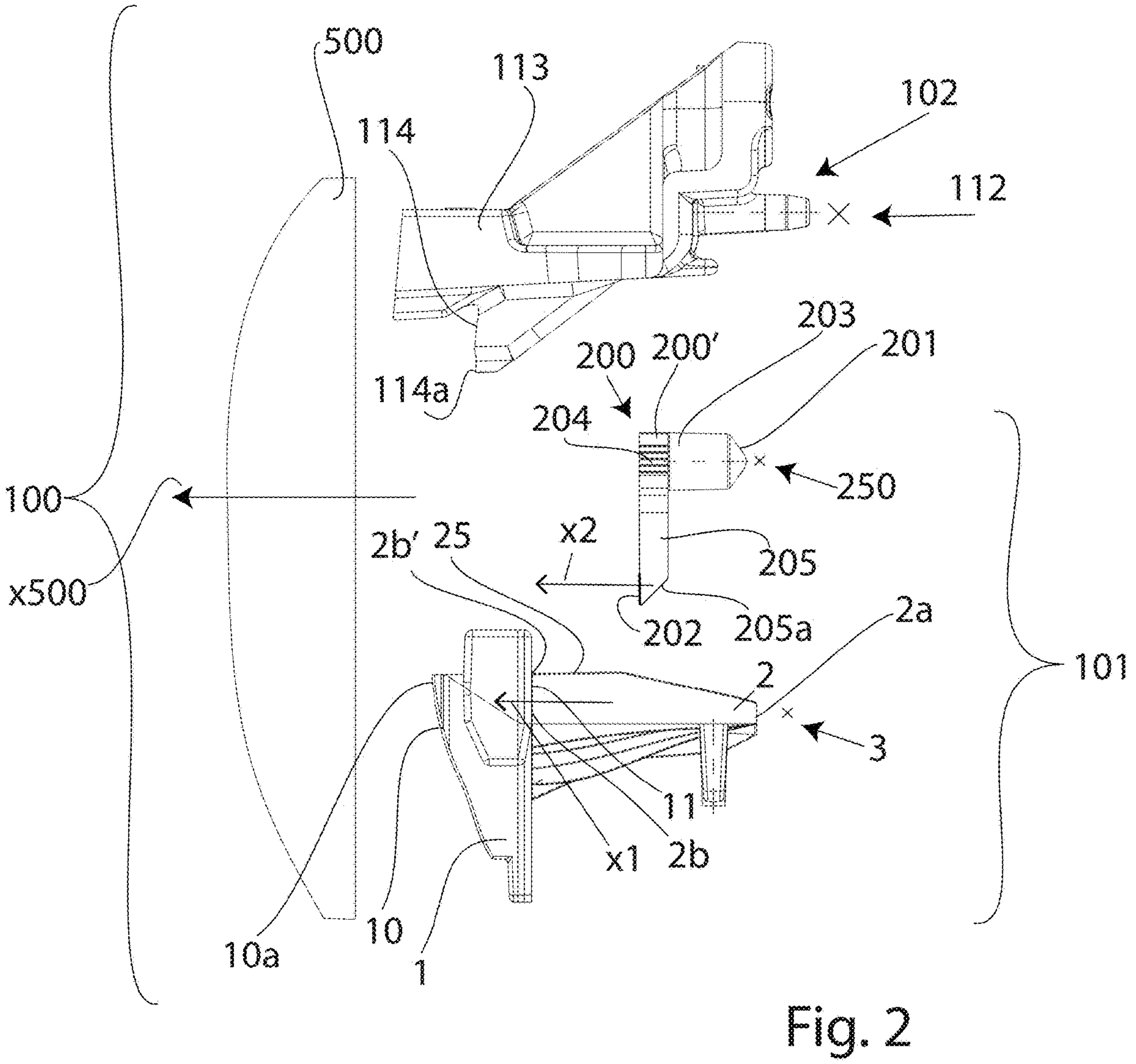
FIG. 2 shows the illumination device from FIG. 1 in a schematic exploded side view.
Figure 2A:
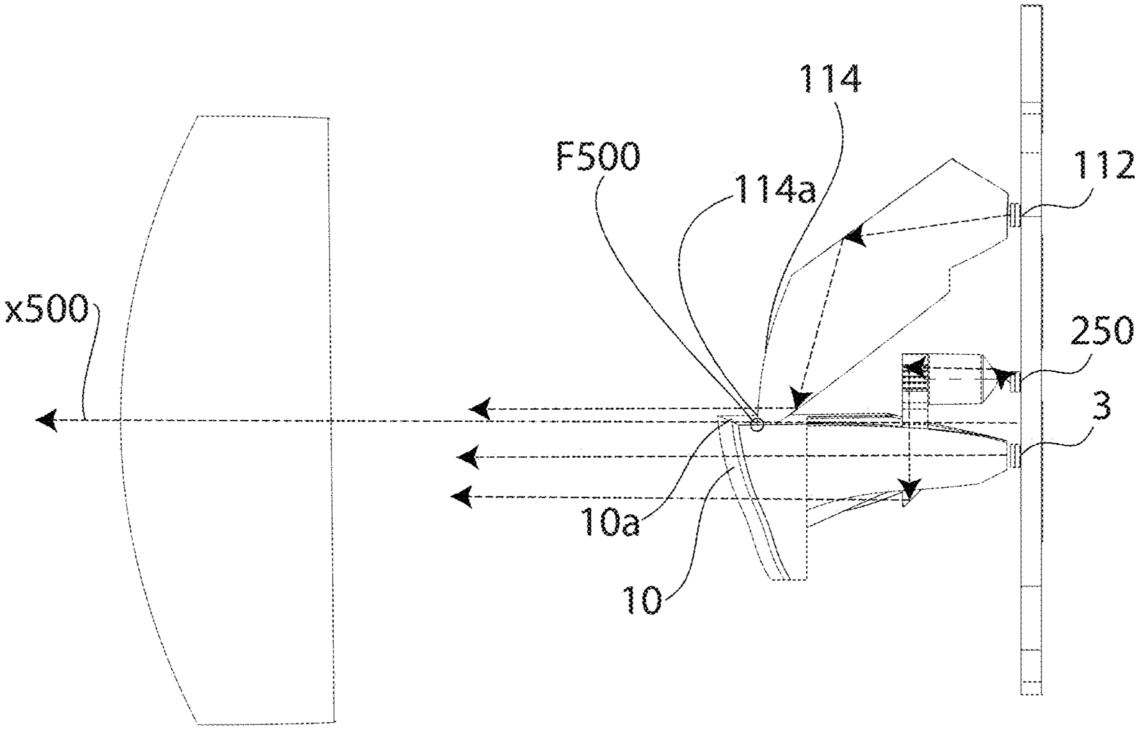
FIG. 2A shows the illumination device from FIG. 2 in an assembled state.

FIG. 1, FIG. 2, and FIG. 2A show an illumination device 100 according to the invention for a motor vehicle headlight, wherein FIGS. 1 and 2 show an exploded view and FIG. 2A shows the illumination device 100 in an assembled state.

The illumination device 100 comprises an illumination unit 101 (also referred to as the "first" illumination unit) as well as a further illumination unit 102, the so-called main illumination unit 102 or "second" illumination unit.

Figure 8:
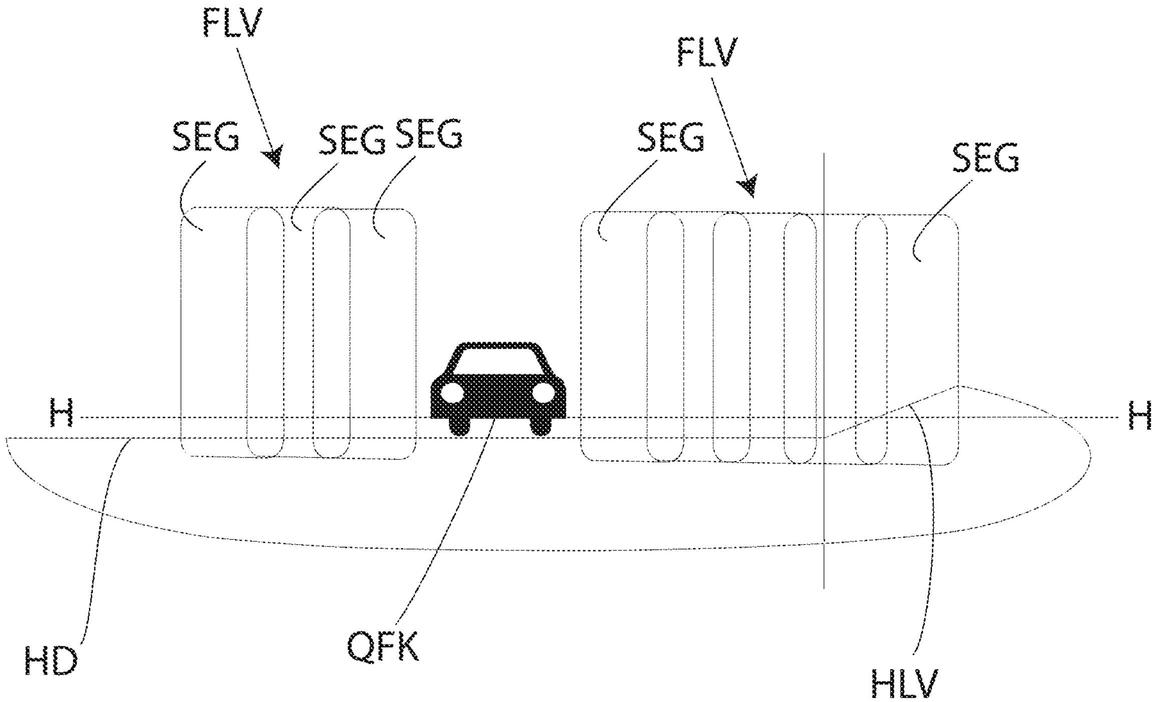
FIG. 8 shows dipped beam distribution together with partial full beam distribution without sign light light distribution.

The main illumination unit 102 is designed to produce a main light distribution HLV, e.g. a dipped beam distribution with a cut-off line HD, as shown in FIG. 8.

The first illumination unit 101 is designed to produce segmented light distribution FLV (FIG. 8).

Together, when the main illumination unit 102 produces the main light distribution HLV and the first illumination unit 101 is also activated, full beam distribution is produced if all light segments SEG of the segmented light distribution FLV are activated.

Furthermore, an ADB light function can be produced as individual light segments SEG can be switched off, as shown by way of example in FIG. 8, where those light segments that would illuminate areas where a vehicle QFK, in particular an oncoming vehicle, is located, are switched off.

Returning to FIGS. 1, 2, 2A, and 3-6, it can be seen that the illumination unit 101 comprises an optical body 1 with an optical body light exit surface 10, wherein the optical body 1 is formed from an optically transparent material.

Figure 3:
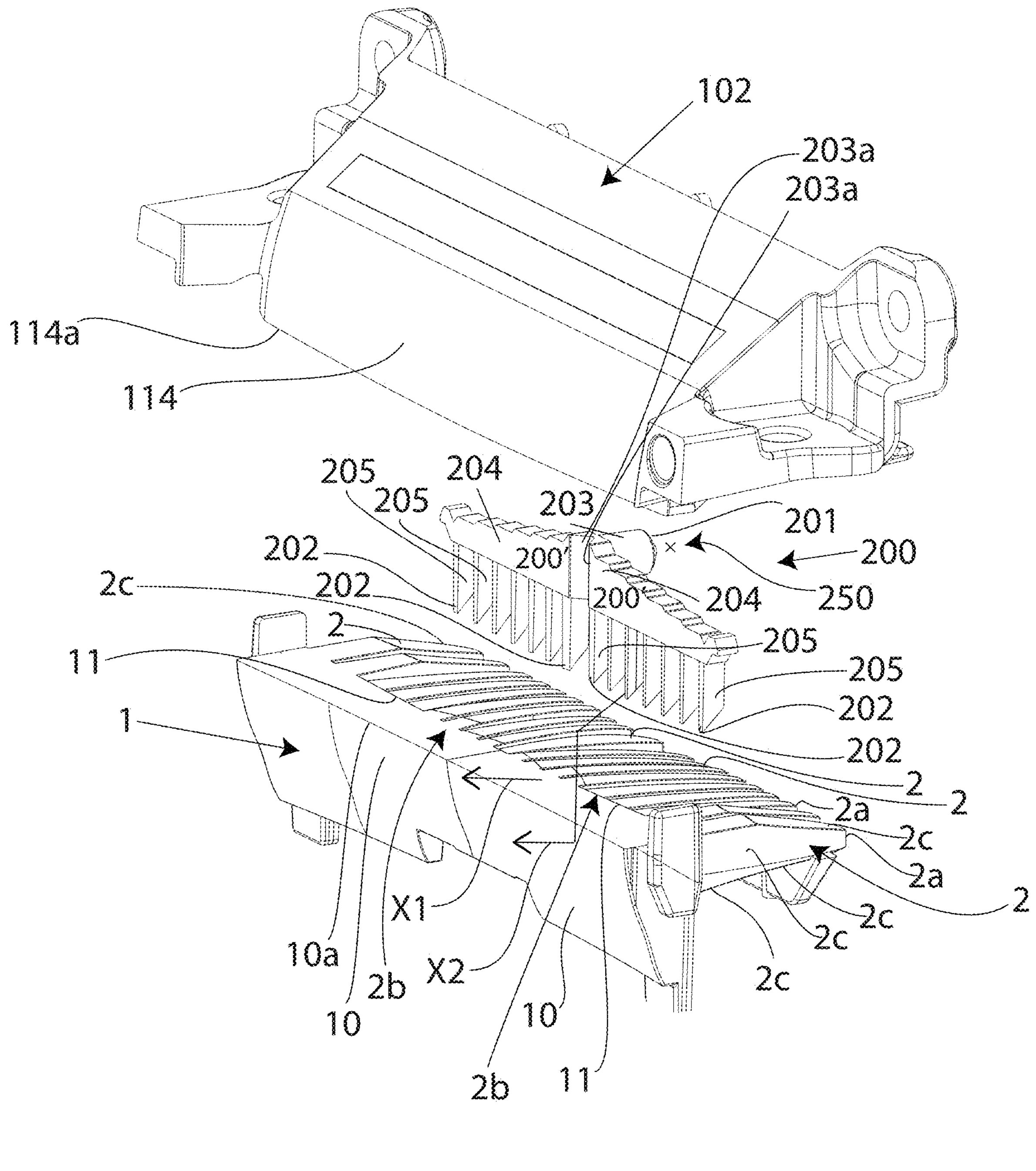
FIG. 3 shows an illumination unit of the illumination device from FIG. 1 in a perspective schematic view.
Figure 4:
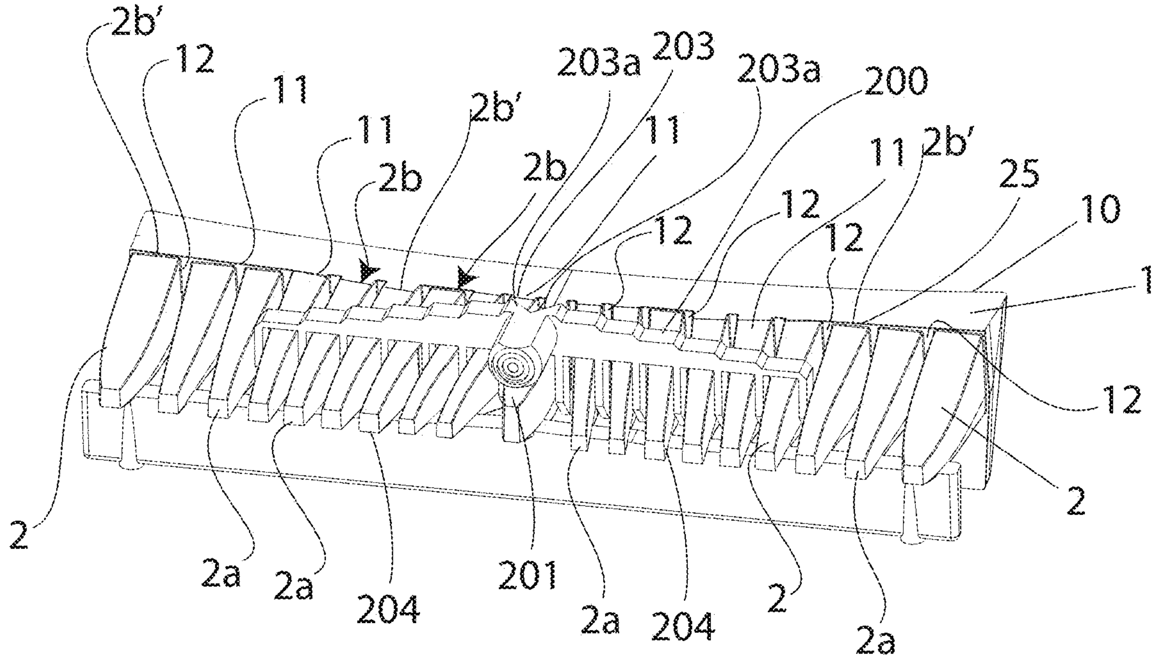
FIG. 4 shows the illumination unit from FIG. 3 in a view from diagonally behind.

As shown in particular in FIGS. 3 and 4, the illumination unit 101 further comprises a plurality of light guiding bodies 2, wherein each light guiding body 2 has a light entry surface 2*a* and a light exit surface 2*b*. At least one light source 3 (schematically indicated as "x" in FIGS. 2, 2A), usually in the form of one or more LEDs, is associated with each light guiding body 2, wherein the at least one light source 3 of a light guiding body 2 can only inject light into this light guiding body 2 via its light entry surface 2*a* if it is switched on.

The light guiding bodies 2 are also formed from an optically transparent material such that light that enters a light guiding body 2 can propagate from the light entry surface 2*a* to its light exit surface 2*b*, wherein at least some of the light injected into the light guiding body 2 and striking lateral boundary surfaces 2*c* of the light guiding body 2 is totally reflected at the boundary surfaces 2*c*.

The light guiding bodies 2 are arranged side-by-side when installed in a motor vehicle. The light guiding bodies 2 merge into the optical body 1 with their light exit surfaces 2*b* in an optical body merging surface 11 opposite the optical body light exit surface 10 of the optical body 1.

Figure 4A:
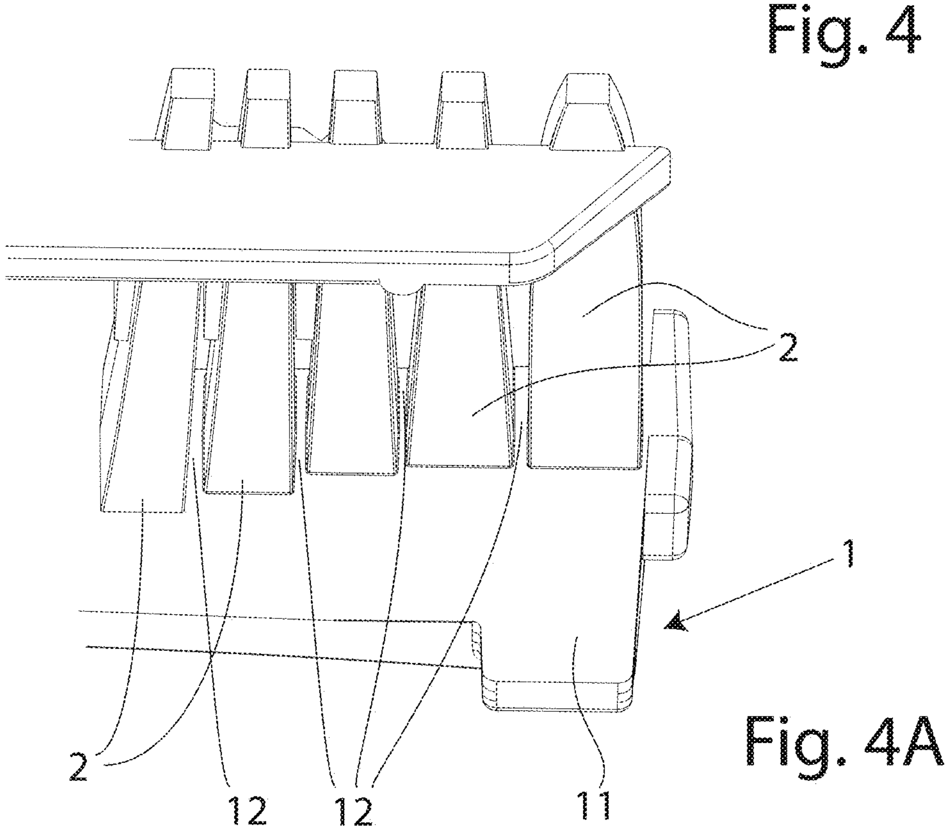
FIG. 4A shows a section of a merging surface of an optical body in the region of open spaces.

The light guiding bodies 2 are arranged in such a way that light exit surfaces 2*b* of the (laterally) adjacent light guiding bodies 2 have a distance from one another greater than zero resulting respectively in an open space 12 between two adjacent light guiding bodies 2 on the optical body merging surface 11, see FIG. 4 and FIG. 4A.

By way of example, it can be provided that the optical body 1 and the light guiding bodies 2 are formed in one piece, and preferably from the same optically transparent material. It can further be provided that the light entry surfaces 2*a* of the light guiding bodies 2 are arranged at a distance greater than zero to one another, and the light guiding bodies 2 preferably taper from the light exit surface 2*b* towards the light entry surface 2*a* and have, for example, a conical shape.

Light from the light guiding bodies 2 enters the optical body 1 via the merging surface 11 and exits it again via the optical body light exit surface 10. The illumination device 100 further comprises a projection device 500 (see FIG. 2, 2A), in particular a projection optical device, for example a projection lens, which is arranged downstream of the two illumination units 101, 102 in the light propagation direction. The light that is emitted by the light sources 3, injected into the optical body 1 via the merging surface 11 and exits via the light exit surface 10 is projected by the projection device 500 in the form of segmented light distribution FLV (see FIG. 8).

As already described above, the illumination unit 101 is an illumination unit for generating segmented light distribution FLV, which lies substantially above the horizontal 0°-0° line H-H line) and additionally forms a full beam with a dipped beam or front area light distribution HLV. The segmented light distribution FLV lies largely above the 0°-0° line, while the lower areas lie on the 0°-0° line or preferably slightly below it in a known manner, such that they connect to a dipped beam or front area light distribution or overlap it slightly.

In particular, such segmented light distribution can be used for ADB (Adaptive Driving Beam), in which areas above the cut-off line, in particular oncoming traffic areas, can be blanked out, as has already been described.

The illumination unit 101 further comprises an additional optical device 200, wherein the additional optical device 200 has at least one, preferably as shown exactly one light entry area 201 as well as one or, as shown preferably more light extraction areas 202. Each light entry area 201 is associated with at least one additional light source 250, in particular in the form of one or more LEDs. In the example shown, exactly one additional light source 250 is provided.

If the additional light source 250 is switched on, at least some of the light emitted by it and injected into the additional optical device 200 via the light entry area 201 propagates in the additional optical device 200 to the light extraction areas 202 and exits the additional optical device 200 there.

As described, there are open spaces or areas 12 between adjacent light guiding bodies 2 on the merging surface 11 of the optical body 1 where the light guiding bodies 2 merge into it, which the present invention makes use of, and respectively at least one, preferably exactly one, light extraction area 202 of the additional optical device 200 is positioned between two adjacent light guiding bodies 2 in such a way that light exiting a light extraction area 202 enters the optical body 1 via the open space 12 between the two light guiding bodies 2 and propagates therein to the optical body light exit surface 10 of the optical body 1.

The light injected into the optical body 1 via the additional optical device 200 in this way and exiting via the light exit surface 10 is projected via the projection device 500 as separate light distribution SV, in particular as sign light light distribution SV.

The open spaces 12 are, for example, flat. It can be advantageous if an optical structure, for example in the form of grooves, is provided in the open spaces 12, for example in the generally flat open spaces, in order to achieve uniformity of the generated light distribution, in particular the sign light light distribution SV, in the horizontal direction.

The optical body light exit surface 10 is delimited towards the top by an edge 10*a*. The edge 10*a* is preferably approximately or exactly level with the upper edge 2*b*' of the light guiding bodies 2*b*. The optical body light exit surface 10 is—not limited to the specific embodiment described here, but in the general context—preferably arranged in such a way that the optical body light exit surface 10 lies approximately in a focal surface of the projection device 500 or in such a way that the edge 10*a* lies in a focal point F500 of the projection device 500. This results in an image of the light distribution FLV with the desired sharpness, in particular of the light segments SEG. In particular, the edge 10*a* is displayed in the light image as the lower, sharp boundary of the light segments SEG.

Figure 7:
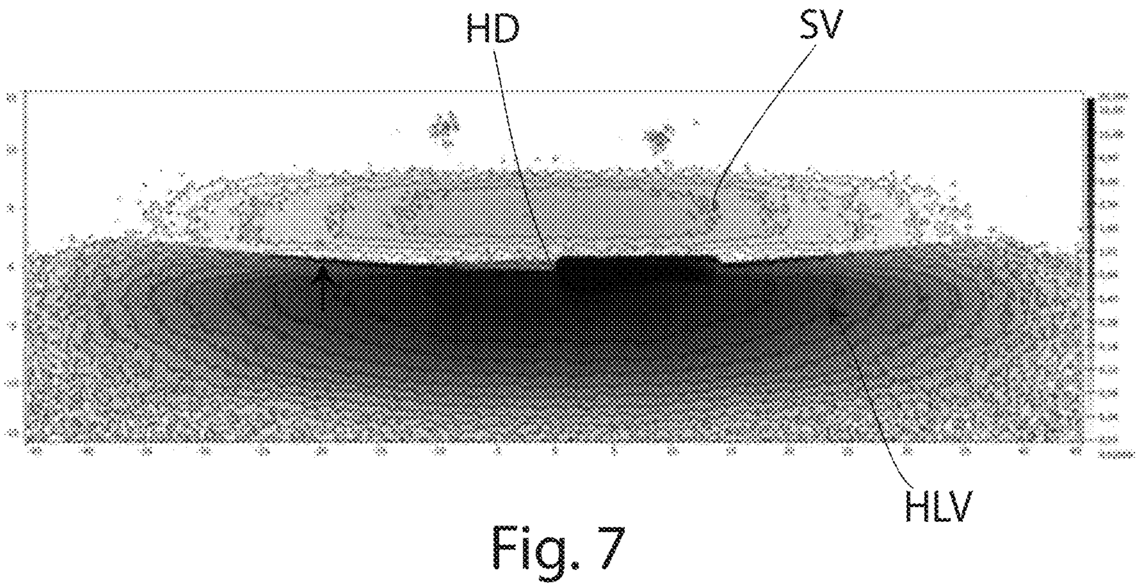
FIG. 7 shows an exemplary, schematic illustration of light distribution in the form of dipped beam distribution and sign light light distribution.

The same applies to the main illumination unit 102, which as described is designed to produce a main light distribution HLV, e.g. a dipped beam distribution with a cut-off line HD, as shown in FIGS. 7 and 8. By way of example, the main illumination unit 102 comprises one or more light sources 112, in particular one or more LEDs, which produce the main light distribution HLV in a known manner in interaction with an optical body 113 which comprises a light exit surface 114. The light exiting the light exit surface 114 of the optical body 113 is correspondingly projected by the projection device 500 into the traffic area. The light exit surface 114 is delimited towards the bottom by an edge 114*a*, which is displayed in the main light distribution (dipped beam or front area light distribution) as a sharp line or boundary, the so-called cut-off line, which delimits this light distribution towards the top. In order to produce a main light distribution with desired sharpness, in particular with desired sharpness of the cut-off line, the light exit surface 114 lies substantially in the focal surface of the projection device 500 or the focal point F500 lies substantially in or on the edge 114*a*.

The use of (a) separate light source(s) 250 to produce a separate light distribution SV, in particular a sign light light distribution, wherein this/these separate light source(s) 250 can be operated independently of the light source(s) 3 of the illumination unit 101 and also independently of the light source(s) 112 of the main illumination unit 102, means that the sign light light distribution SV does not have to be permanently activated, either in dipped beam/front area mode or in ADB mode. In particular in ADB mode, this therefore has the advantage that, with blanked out light segments in the segmented light distribution FLV, glare can be prevented in the blanked-out areas as a result of the sign light SV if this is switched off or—with merely a dimmed light source 250—the risk of glare can be reduced.

The light source 250 can be switched on or off as required and dimmed in different ways, such that the different sign light specifications of ECE, CCC and FMVSS can be met individually. This of course applies in the general context of the present invention and is not limited to a specific exemplary embodiment.

As shown, it is advantageously further provided that the light extraction areas 202 inject into the open spaces 12 below an upper edge 2*b*' of the light exit surfaces 2*b*. The light extraction areas 202 are typically spaced apart from the open spaces, but can also rest against them.

The light coming from the light extraction areas 2*b* is usually projected into an area above a horizontal 0°-0° line in the light image and thus produces the segmented light distribution FLV. In a vertically inverting projection device 500, the light exit surfaces 2*b* of the light guiding bodies 2 are positioned such that their upper edge 2*b*' is approximately level with or just above the optical axis X500 of the projection device 500. As a result of the inverting effect of the projection device 500, light from the light exit surfaces 2*b* is (largely) projected above the 0°-0° line, wherein light from the area of the upper edge 2*b*' is projected in the lower area of the light distribution, close to the 0°-0° line, in particular just below it. (If the upper edge 2*b*' lies exactly on the optical axis X500 of the projection device 500, light coming from the area of the upper edge 2*b*' is projected onto the 0°-0° line.)

Accordingly, light from the light extraction areas 202 of the additional optical device 200 below the upper edge 2*b*' is projected at a distance above a lower boundary of the segmented light distribution FLV, preferably above the horizontal 0°-0° line in the light distribution, resulting in a distance between the main light distribution and the light distribution SV formed with the light from the light extraction areas 202.

Figure 6:
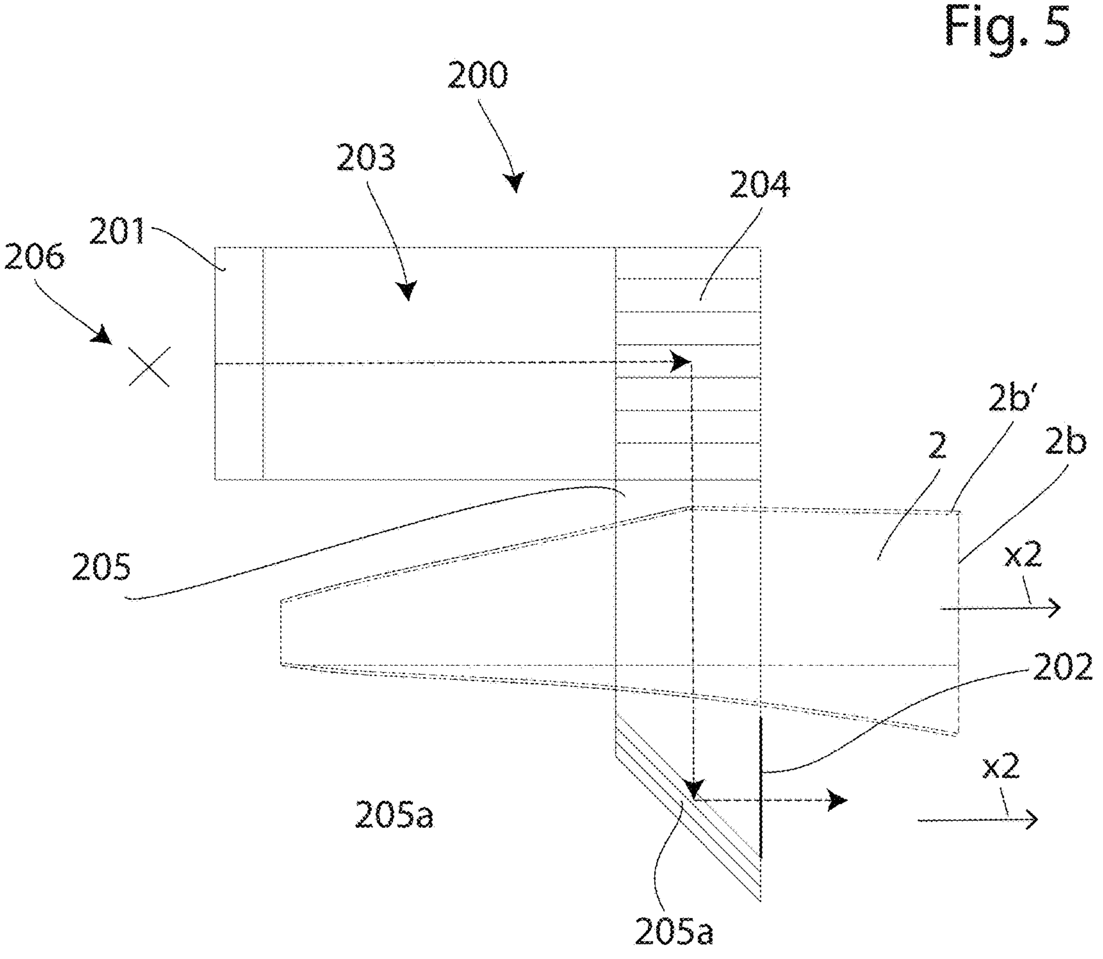
FIG. 6 shows the additional optical device from FIG. 5 in a side view.

It can preferably be provided that a main light emission direction X2 of the light exiting a light extraction area 202 is directed approximately parallel to the light emission direction X1 in which light travels from a light guiding body 2 adjacent to the light extraction area 202 (FIG. 3, FIG. 6).

In this context, it should be noted that parallel light does not typically exit the light guiding bodies 2; the light emission direction X1 in this case refers to the resulting direction of all emitted light rays.

The main light emission direction X2 of the light exiting a light extraction area 202 or the light extraction areas 202 is directed in such a way that the light is projected by the projection device 500 into an area above a 0°-0° line, in particular in such a way that the light of all light extraction areas 202 forms a sign light light distribution SV.

The additional optical device 200 preferably consists, as shown, of a body 200' which is formed from a light-guiding material, wherein this body 200' has the light entry area 201 as well as a supply area 203 adjacent thereto, wherein the supply area 203 transitions into a distribution area 204, via which the light coming from the at least one additional light source 250 is distributed to the one or more light extraction areas 202.

The light extraction areas 202 are preferably also part of the body 200'.

Figure 5:
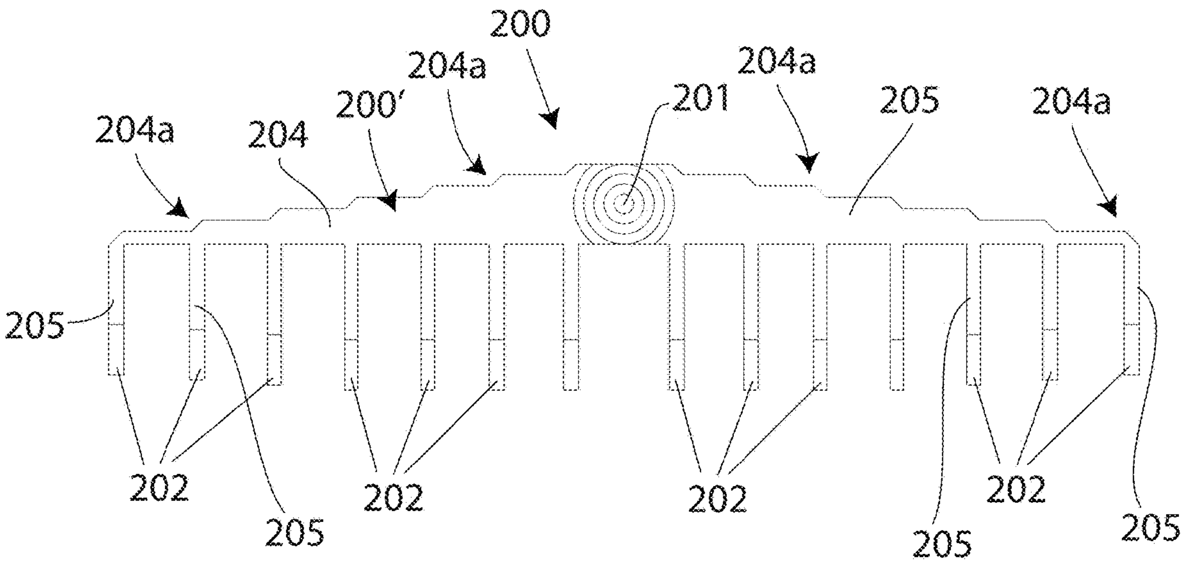
FIG. 5 shows an additional optical device for producing a sign light light distribution in a view from behind.

The light entry area 201 preferably directs the injected light rays in parallel, for example by means of a Fresnel lens structure, see FIG. 5.

The light entry area 201 preferably comprises optical elements or an optical structure which directs the inject light in parallel. By way of example, the light entry area 201 has a Fresnel lens structure (see FIG. 5) or is designed in the form of a collimator. The parallel directed light can thus subsequently propagate in the additional optical device 200 by means of total internal reflection, in that it propagates through the supply area 203; at the end of the supply area 203, it encounters a deflection structure, which in this specific case consists of two deflection surfaces 203*a*, where the parallel light is deflected from the supply area 203 into the distribution area 204.

Furthermore, an area not shown in more detail is provided, which distributes light that propagates in the supply area 203 to the distribution areas 204 in a known manner, for example by means of one or more deflection surfaces.

The supply area 203 can, as shown, run approximately parallel to the light guiding bodies 2 and the distribution areas 204 can run transverse to the light guiding bodies 2 and/or transverse to the supply area 203, in particular substantially normal to the supply area 203 (FIG. 5, FIG. 6). Furthermore, it is provided that a diversion section 205 is provided for each light extraction area 202, which is connected to the distribution area 204, in particular is formed integrally therewith, with which diversion section 205 light is supplied to the light extraction area 202.

This results in a comb shape of the additional optical device 200 shown in FIG. 5, for example.

The distribution area 204 comprises an optical structure 204*a*, which is designed in such a way that, on the one hand, light propagates along the distribution areas 204, and, on the other hand, part of it is deflected into the diversion sections 205. Such structures are well-known and are not explained here in more detail (FIG. 5, 6).

A diversion section 205 respectively preferably has a deflection area 205*a*, which deflects the light injected by the distribution area 204 into the diversion section 205 in the main light emission direction X2 (FIG. 6).

In the exemplary embodiment shown, respectively exactly one light extraction area 202 of the additional optical device 200 is arranged on both sides of the central light guiding body between adjacent light guiding bodies 2, wherein there is no light extraction area between the 3 outermost light guiding bodies respectively. This arrangement can be selected in such a way that the desired or prescribed horizontal width of the sign light light distribution SV is achieved.

The light extraction areas 202 are preferably spaced apart from the open spaces 12 of the optical body 1. During assembly, for example, the additional optics 200 are inserted into the optical body 1 from above into the desired position and can be clamped between the optical body 1 and the optical body 113 of the main illumination unit 102 for fixation. Furthermore, an additional holding element (not shown) can be provided.

The invention accordingly has advantages in terms of the glare value, in particular when the illumination device is operated in ADB (Adaptive Driving Beam) mode, in which individual regions or segments of (partial) full beam distribution can be switched off. The fact that the sign light can be independently switched off or dimmed in this operating state, in contrast to the prior art, means that it cannot cause glare in the blanked-out region or in the blanked out/switched off segments or the risk of glare can be reduced. Safety can be enhanced for all road users thanks to the reduction or elimination of undesired "residual light", in particular in blanked out regions, made possible by the invention. In dipped beam mode, the sign light can be activated to enable the driver, for example, to read overhead signs more easily. In "normal" full beam mode, the sign light light source can be switched on.

The invention claimed is:

1. An illumination device (100) for a motor vehicle headlight, the illumination device (100) comprising:

an illumination unit (101), which comprises:

an optical body (1) with an optical body light exit surface (10), wherein the optical body (1) is formed from an optically transparent material;

a plurality of light guiding bodies (2), wherein each light guiding body (2) has a light entry surface (2*a*) and a light exit surface (2*b*); and at least one light source (3) for each light guiding body (2), wherein the at least one light source (3) of a light guiding body (2) can only inject light into this light guiding body (2), and wherein the light from the at least one light source (3) of a light guiding body (2) is injected into the light guiding body (2) via the light entry surface (2*a*) thereof, wherein the light guiding bodies (2) are formed from an optically transparent material such that light that enters a light guiding body (2) can propagate from the light entry surface (2*a*) to the light exit surface (2*b*) and wherein at least some of the light injected into the light guiding body (2) and striking lateral boundary surfaces (2*c*) of the light guiding body (2) is totally reflected at the boundary surfaces (2*c*), wherein the light guiding bodies (2) are arranged side-by-side, wherein the light guiding bodies (2) merge into the optical body (1) with their light exit surfaces (2*b*) in an optical body merging surface (11) opposite the optical body light exit surface (10) of the optical body (1), wherein the light guiding bodies (2) are arranged in such a way that light exit surfaces (2*b*) of adjacent light guiding bodies (2) have a distance from one another greater than zero resulting respectively in an open space (12) between two adjacent light guiding bodies (2) on the optical body merging surface (11), wherein the illumination device (100) further comprises a projection device (500), which displays the light emitted by the light sources (3) in the form of segmented light distribution (FLV), wherein the illumination unit (101) further comprises an additional optical device (200), which has at least one light entry area (201) and which has one or more light extraction areas (202), wherein each light entry area (201) is associated with at least one additional light source (250), and wherein at least some of the light injected by an additional light source (250) into the additional optical device (250) via a light entry area (201) propagates in the additional optical device (250) to the one or more light extraction areas (202) and leaves the additional optical device (200) there, and wherein respectively at least one light extraction area (202) is arranged between two adjacent light guiding bodies (2) in such a way that light exiting the light extraction area (202) can enter the optical body (1) via the open space (12) between the two light guiding bodies (2) and can propagate therein to the optical body light exit surface (10) of the optical body (1).

2. The illumination device according to claim 1, wherein the light extraction areas (202) are arranged below an upper edge (2*b*') of the light exit surfaces (2*b*).

3. The illumination device according to claim 1, wherein a main light emission direction (X2) of the light exiting a light extraction area (202) is directed approximately parallel to the light emission direction (X1) in which light travels from a light guiding body (2) adjacent to the light extraction area (202).

4. The illumination device according to claim 1, wherein a main light emission direction (X2) of the light exiting a light extraction area (202) is directed in such a way that the light is projected by the projection device (500) into an area above a 0°-0° line, in such a way that the light of all light extraction areas (202) forms a sign light light distribution (SV).

5. The illumination device according to claim 1, wherein the additional optical device (200) consists of a body (200') which is formed from a light-guiding material.

6. The illumination device according to claim 5, wherein two or more light extraction areas (202) are provided, and wherein the distribution area (204) and the light extraction areas (202) have a comb-like shape.

7. The illumination device according to claim 5, wherein the supply area (203) runs approximately parallel to the light guiding bodies (2) and the distribution area (204) runs transverse to the light guiding bodies (2) and/or transverse to the supply area (203), in particular substantially normal to the supply area (203), and wherein a diversion section (205) is provided for each light extraction area (202), which is connected to the distribution area (204), in particular is formed integrally therewith, with which diversion section (205) light is supplied to the light extraction area (202).

8. The illumination device according to claim 1, wherein respectively at least one light extraction area (202) is arranged between all adjacent light guiding bodies (2), or wherein at least one light extraction area (202) is arranged at least between two adjacent light guiding bodies (2), which are arranged centrally.

9. The illumination device according to claim 1, wherein the light extraction areas (202) are formed and/or arranged in such a way between adjacent light guiding bodies (2) that a sign light light distribution is produced.

10. The illumination device according to claim 1, wherein the optical body (1) and the light guiding bodies (2) are formed in one piece, from the same optically transparent material.

11. The illumination device according to claim 1, wherein the light entry surfaces (2*a*) of the light guiding bodies (2) are arranged at a distance greater than zero to one another.

12. The illumination device according to claim 1, wherein the light rays emitted by the light guiding bodies (2) of the illumination unit (101) are projected by the projection device (500) as segmented light distribution (FLV), wherein the light distribution (FLV), which comprises two or more adjacent light segments (SEG) lies at least partially, in particular for the most part, above a 0°-0° line.

13. The illumination device according to claim 1, wherein open spaces (12), in particular all open spaces are flat and/or an optical structure, for example in the form of grooves, is provided in or on open spaces (12), in particular in or on all open spaces, in order to achieve uniformity of the generated light distribution, in particular the sign light light distribution SV, in the horizontal direction.

14. The illumination device according to claim 1, further comprising an illumination unit (102), the so-called main illumination unit (102), wherein the main illumination unit (102) is designed to produce a main light distribution (HLV), in particular a dipped beam distribution, preferably a dipped beam distribution with a cut-off line, or a front area light distribution, wherein the main light distribution (HLV) and the segmented light distribution (FLV) together form a full beam distribution if all light segments (SEG) of the segmented light distribution (FLV) are illuminated, and wherein, for example, in a main lighting mode, the main illumination unit (102) for generating the light distribution (LV) and the additional light source (250) for generating the sign light light distribution (SV) are activated and the light sources (3) of the illumination unit (101) are deactivated, and wherein in a partial full beam mode, the main illumination unit (102) and at least one light source (3), but not all light sources (3) of the illumination unit (101), are activated and the additional light source (250) is dimmed or deactivated.

15. A motor vehicle headlight having at least one illumination device according to claim 1.

16. The illumination device according to claim 1, wherein exactly one light extraction area (202) is arranged between the two adjacent light guiding bodies (2).

17. The illumination device according to claim 5, wherein the body (200') which forms the additional optical device (200) has the at least one light entry area (201) as well as at least one supply area (203) adjacent thereto, wherein the at least one supply area (203) transitions into a distribution area (204), via which the light coming from the at least one additional light source (250) is distributed to the one or more light extraction areas (202).

18. The illumination device according to claim 7, wherein the diversion section (205) has a first deflection area (205*a*), which deflects the light injected by the distribution area (204) into the diversion section (205) in the main light emission direction (X2).

19. The illumination device according to claim 8, wherein respectively exactly one light extraction area (202) is arranged between several central adjacent light guiding bodies (2).

20. The illumination device according to claim 11, wherein the light guiding bodies (2) taper from the light exit surface (2*b*) towards the light entry surface (2*a*).

* * * * *